W. H. DEGGES.
EYE SHADE.
APPLICATION FILED MAY 6, 1909.
947,636.
Patented Jan. 25, 1910.
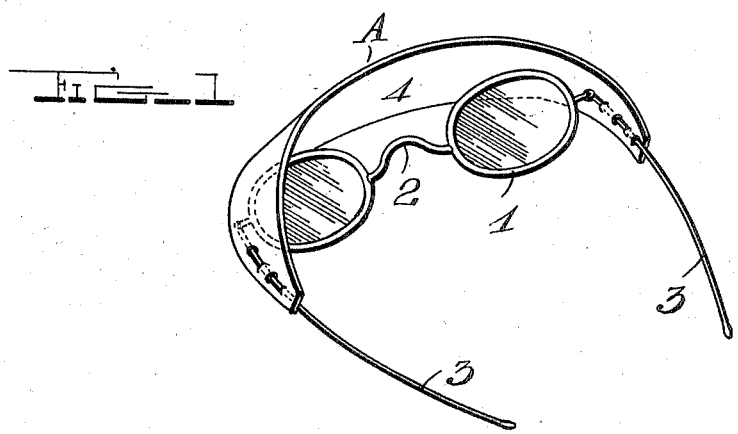
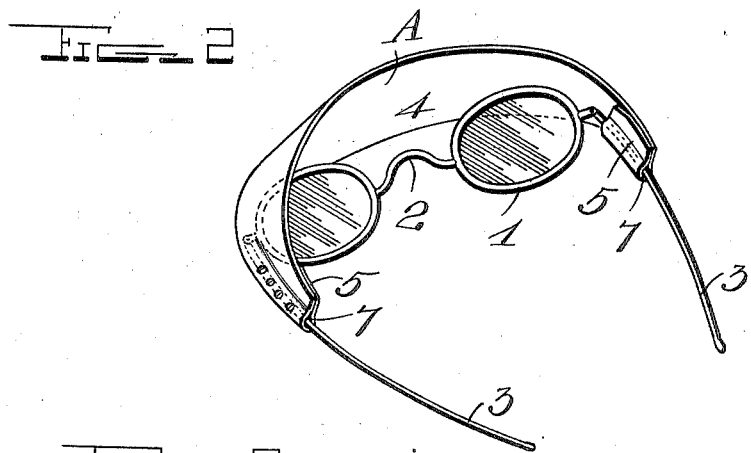
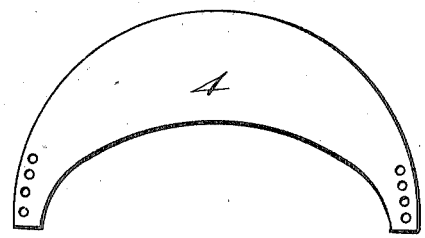
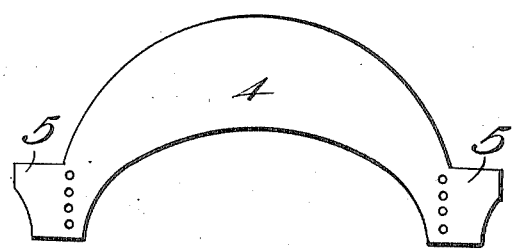
Witnesses
C. H. Griesbauer
Inventor
William H. Degges
by H. B. Willson &co
Attorneys

UNITED STATES PATENT OFFICE.

WILLIAM HAMILTON DEGGES, OF WASHINGTON, DISTRICT OF COLUMBIA.

EYE-SHADE.

947,636.  Specification of Letters Patent.  Patented Jan. 25, 1910.

Application filed May 6, 1909. Serial No. 494,246.

*To all whom it may concern:*

Be it known that I, WILLIAM HAMILTON DEGGES, a citizen of the United States, residing at Washington, in the District of Columbia, have invented certain new and useful Improvements in Eye-Shades; and I do declare the following to be a full, clear, and exact description of the invention, such as will enable others skilled in the art to which it appertains to make and use the same.

My invention relates to eye shades, and particularly to that type which are adapted to be attached to spectacles or eye glasses.

The object of the invention is to provide a device of this character which will be cheap to manufacture and easy of application, and which will have no parts other than those made out of the material of which the shade itself is constructed.

With this and other objects in view, the invention consists of certain novel features of construction, combination and arrangement of parts, as will be more fully described and particularly pointed out in the appended claims.

In the accompanying drawings: Figure 1 is a perspective view of one form of the device attached to a pair of spectacle frames; Fig. 2, is a similar view of another form of the invention; Fig. 3, is a plan view of the blank before being bent into the shape shown in Fig. 1; and, Fig. 4, is a similar view of the blank before being bent into the shape shown in Fig. 2.

Referring more especially to the drawings, 1 represents the eye glass frame, 2 the nose piece thereof, and 3 the side pieces or temple bars which project backwardly along side of the head and frequently extend over the ear. A denotes the eye shade.

In the form shown in Figs. 1 and 3 the blank forming the eye shade comprises a single sheet of material 4, preferably made of paper, celluloid or the like, or of any other suitable material which has sufficient elasticity and flexibility to be bent into shape, and which may have the attaching means formed thereon built up from the material itself. The blank 4, as shown in Fig. 3, comprises a relatively long strip of material curved on the arc of a circle in the shape of a crescent so that when bent, it will conform to the usual shape of an eye shade. The body has at each end attaching means, shown as perforations or openings so as to permit of the engagement of the temple bars 3. A number of these perforations or openings are shown so that the device may be readily adjusted for different widths of brows.

In Figs. 2 and 4, I have represented a blank of the same general outline as that shown in Figs. 1 and 3, but have provided at the ends of the body portion reinforcing strips 5, which are folded over and pasted down on the inner surface of the ends of the shade and cover the perforations or openings and prevent the entrance of light and at the same time serve as additional attaching means for the temple bars, for the material at the points of the folds is left open and forms tubular passages 7, (as shown in Fig. 2), through which the temple bars may be threaded and adjusted to position. It is apparent therefore that the temple bars may be threaded through the perforations or openings as in the construction shown in Fig. 1 or passed through the tubular passage 7 as shown in Fig. 2, as the user may elect.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim and desire to secure by Letters Patent is:

1. A device of the class described, comprising a single crescent shaped sheet of flexible material having each end thereof folded over and providing means to receive the temple bar of a spectacle frame.

2. A device of the class described, comprising a single crescent shaped sheet of flexible material having a series of openings at each end thereof, said openings adapted to receive the temple bar of a spectacle frame.

3. A device of the class described comprising a single crescent-shaped sheet of flexible material having a series of perforations at each end, said perforations adapted to receive the temple bar of a spectacle frame, and means secured to the ends over
5 the perforations to reinforce the ends and prevent the entrance of light through the perforations.

In testimony whereof I have hereunto set my hand in presence of two subscribing witnesses.

WILLIAM HAMILTON DEGGES.

Witnesses:
E. EDMONSTON, Jr.,
E. F. GILL.